(12) United States Patent
Kim et al.

(10) Patent No.: US 12,173,154 B2
(45) Date of Patent: Dec. 24, 2024

(54) HIGH-RIGIDITY AND HIGH-HEAT RESISTANCE THERMOPLASTIC COMPOSITE MATERIAL COMPOSITION AND MOLDED PRODUCT MANUFACTURED THEREFROM

(71) Applicant: KOLON SPACEWORKS CO., LTD., Haman-gun (KR)

(72) Inventors: Jun Youp Kim, Gimcheon (KR); Seongwon Seo, Gimcheon (KR)

(73) Assignee: KOLON SPACEWORKS CO., LTD., Gimcheon (KR)

( * ) Notice: Subject to any disclaimer, the term of this patent is extended or adjusted under 35 U.S.C. 154(b) by 523 days.

(21) Appl. No.: 17/607,426

(22) PCT Filed: Sep. 24, 2020

(86) PCT No.: PCT/KR2020/012986
§ 371 (c)(1),
(2) Date: Oct. 29, 2021

(87) PCT Pub. No.: WO2021/060882
PCT Pub. Date: Apr. 1, 2021

(65) Prior Publication Data
US 2022/0220309 A1    Jul. 14, 2022

(30) Foreign Application Priority Data

Sep. 27, 2019 (KR) .......................... 10-2019-0119891

(51) Int. Cl.
| | | |
|---|---|---|
| *C08L 81/02* | (2006.01) | |
| *C08J 5/04* | (2006.01) | |
| *C08J 5/06* | (2006.01) | |

(52) U.S. Cl.
CPC .............. *C08L 81/02* (2013.01); *C08J 5/042* (2013.01); *C08J 5/06* (2013.01); *C08J 2381/02* (2013.01); *C08J 2479/08* (2013.01)

(58) Field of Classification Search
CPC .... C08L 81/02; C08J 5/042; C08J 5/06; C08J 2381/02; C08J 2479/08
See application file for complete search history.

(56) References Cited

U.S. PATENT DOCUMENTS

| | | | | |
|---|---|---|---|---|
| 4,434,263 A | * | 2/1984 | Blackwell | ................ C08K 3/40 |
| | | | | 106/504 |
| 2016/0009951 A1 | * | 1/2016 | Crawford | ................ E04D 13/03 |
| | | | | 524/605 |

FOREIGN PATENT DOCUMENTS

| | | | |
|---|---|---|---|
| JP | 08053621 A | | 2/1996 |
| JP | H0853621 | * | 2/1996 |
| JP | 2008544037 A | | 12/2008 |
| KR | 1020120069798 A | | 6/2012 |
| KR | 1020140060154 A | | 5/2014 |
| KR | 1020160067433 A | | 6/2016 |
| KR | 102103927 B1 | | 4/2020 |

\* cited by examiner

*Primary Examiner* — Robert S Jones, Jr.
*Assistant Examiner* — Jiangtian Xu
(74) *Attorney, Agent, or Firm* — Harvest IP Law, LLP

(57) ABSTRACT

The present invention relates to a thermoplastic composite composition comprising (a) a first polymer resin including a polyphenylene sulfide polymer having a melt index (ASTM D-1238, 235° C.) of 100 to 150 g/10 min; (b) a second polymer resin including a polyphenylene sulfide polymer having a melt index (ASTM D-1238, 235° C.) of 250 to 850 g/10 min, and an amorphous monomer having an aliphatic cyclobutanediol; (c) a carbon fiber surface-treated with a polyimide; (d) a fatty acid compound; and (e) a heat-resistant additive.

7 Claims, No Drawings

HIGH-RIGIDITY AND HIGH-HEAT RESISTANCE THERMOPLASTIC COMPOSITE MATERIAL COMPOSITION AND MOLDED PRODUCT MANUFACTURED THEREFROM

CROSS REFERENCE TO RELATED APPLICATIONS

This application is a National Stage Application of International Application No. PCT/KR2020/012986 filed on Sep. 24, 2020, which claims priority to and the benefits of the filing dates of Korean Patent Application No. 10-2019-0119891 filed with the Korean Intellectual Property Office on Sep. 27, 2019, and the entire contents of which are incorporated herein by reference.

DESCRIPTION ABOUT NATIONAL SUPPORT RESEARCH AND DEVELOPMENT

This study was supported by following national research projects: Ministry of Trade, Industry and Energy, Republic of Korea (Development of aircraft reinforcement panel and "C" and "Z" channel using carbon fiber UD Tape with PPS and PEEK fiber content of 60 wt % or more, Project No. 10076849) under the superintendence of Kolon Plastics Co., Ltd.

TECHNICAL FIELD

The present invention relates to a thermoplastic composite composition and a molded product manufactured therefrom, and more particularly, to a high-rigidity and high-heat resistance thermoplastic composite composition and a molded product manufactured therefrom.

BACKGROUND ART

A composite refers to a material prepared by mixing or combining materials with different components and properties to maximize each property or to have new properties not expressed in a single material. The composite is basically superior in terms of various properties such as strength, corrosion resistance, abrasion resistance, impact resistance, fatigue life-span, and the like, compared with a conventional material, and thus is applied to various industry fields such as aerospace, ships, construction, automobiles, energy, and the like, and in each field, various studies on weight reduction are being conducted considering characteristics of the composite.

Particularly, since the aerospace field has a very high demand for weight reduction in order to increase fuel efficiency, many composites are applied thereto.

Since aircraft parts require not only light weight but also flame retardancy to minimize damage to an aircraft and protect passengers due to ignition while flying and in space, research on using a non-combustible material while simultaneously securing weight reduction by molding a thermosetting resin is being conducted.

Korean Patent Laid-Open Publication No. 2017-0123264 discloses a flame-retardant thermoplastic material including a thermoplastic base resin, a flame retardant, and optionally an antioxidant, wherein the flame retardant includes a complex of a phosphine oxide and a transition metal salt.

However, the thermoplastic resin has drawbacks of being hardly expected to exhibit high rigidity required to satisfy high strength and weight reduction for interior and structural parts of an aircraft, and also not securing flame retardancy necessary for aviation regulations.

In order to improve these drawbacks, an attempt to use various flame retardants or develop various composites for securing the high rigidity is being made, but when the flame retardancy is reinforced, physical properties may not only be deteriorated, but also specific strength and specific rigidity are significantly deteriorated, compared with those of a thermosetting composite.

Accordingly, development of composites by using various thermoplastic resins with high heat resistance such as PEEK, PPS, PEI, and the like is being made, but the corresponding resins have problems of being processed only at a very high temperature and having no good affinity with a carbon fiber, which is a main material of the composites.

In order to overcome these problems, various types of research are being conducted on development of a carbon fiber with maximized impregnation and affinity by completely removing a fiber surface sizing agent, which is necessary for bundling and secondary processing the fiber, or development of an imide-based sizing agent using a polyamic acid salt rather than a conventional silane-based sizing agent so that the sizing agent may not be lost but may maintain its function despite the high heat resistance.

However, since the imide-based sizing agent actually has a very stable structure due to its own nature and thus impedes impregnation of the fiber with a high heat-resistant resin, there is a problem of deteriorating the impregnation of the fiber with the most important resin in composites.

Accordingly, as a result of the efforts of the present inventors to solve this problem, a stable and economical composite with high rigidity and high heat resistance is developed by using a polymer resin including an amorphous monomer having an aliphatic cyclobutanediol to maximize compatibility of the thermoplastic resin with high heat resistance and the carbon fiber surface-treated with a polyimide, completing the present invention.

DISCLOSURE

Description of the Drawings

Technical Problem

An object of the present invention provides a high-rigidity and high-heat resistance thermoplastic composite composition applicable to the manufacture of an aeronautical part.

Another object of the present invention provides high rigidity and high-heat resistance aeronautical interior and a structural molded product.

Technical Solution

In order to achieve the above object, the present invention provides a thermoplastic composite composition including: (a) a first polymer resin including a polyphenylene sulfide polymer having a melt index (ASTM D-1238, 235° C.) of 100 to 150 g/10 min; (b) a second polymer resin including a polyphenylene sulfide polymer having a melt index (ASTM D-1238, 235° C.) of 250 to 850 g/10 min and an amorphous monomer having an aliphatic cyclobutanediol; (c) a carbon fiber surface-treated with a polyimide; (d) a fatty acid compound; and (e) a heat-resistant additive.

In the present invention, the second polymer resin is characterized in that it includes 70 to 80 wt % of the polyphenylene sulfide polymer and 20 to 30 wt % of the amorphous monomer having the aliphatic cyclobutanediol.

In the present invention, the amorphous monomer having the aliphatic cyclobutanediol is characterized in that it has a specific gravity of 1.14 to 1.18 and an inherent viscosity of 0.6 to 1 dL/g.

In the present invention, the carbon fiber is characterized in that it is 800 to 1100 tex (g/km) on average.

In the present invention, it is characterized in that 10 to 30 wt % of the first polymer resin, 10 to 25 wt % of the second polymer resin, 50 to 79 wt % of the carbon fiber surface-treated with a polyimide, 0.5 to 2 wt % of the fatty acid compound, and 0.001 to 3 wt % of the heat-resistant additive are included based on the total amount of the thermoplastic composite composition.

The present invention also provides an aeronautical interior and a structural molded product manufactured from the thermoplastic composite composition.

Advantageous Effects

Since the thermoplastic composite composition according to the present invention uses the polymer resin including the amorphous monomer having the aliphatic cyclobutanediol, impregnation properties may be implemented by increasing compatibility between the carbon fiber and the thermoplastic resin.

MODE FOR INVENTION

In the present invention, a thermoplastic composite having excellent tensile strength, tensile modulus, and compressive strength may be prepared by using a polymer resin including an amorphous monomer having an aliphatic cyclobutanediol to increase compatibility of a thermoplastic resin with high heat resistance and a carbon fiber surface-treated with a polyimide and thus improve impregnation.

In the present invention, the thermoplastic composite composition is prepared by including: a first polymer resin which is a polyphenylene sulfide polymer; a second polymer resin which includes polyphenylene sulfide and is alloyed with an aliphatic cyclobutanediol monomer for improving compatibility and impregnation; a fatty acid compound; a heat-resistant additive, and a carbon fiber surface-treated with a polyimide, and a specimen using the same is prepared. As a result of evaluating properties of the specimen, excellent tensile strength, tensile modulus, and compressive strength are achieved, and accordingly, the thermoplastic composite composition may be used to manufacture an aeronautical interior and a structural molded product.

Accordingly, in one aspect of the present invention, a thermoplastic composite composition includes: (a) a first polymer resin including a polyphenylene sulfide polymer having a melt index (ASTM D-1238, 235° C.) of 100 to 150 g/10 min; (b) a second polymer resin including a polyphenylene sulfide polymer having a melt index (ASTM D-1238, 235° C.) of 250 to 850 g/10 min and an amorphous monomer having an aliphatic cyclobutanediol; (c) a carbon fiber surface-treated with a polyimide; (d) a fatty acid compound; and (e) a heat-resistant additive.

The first polymer resin of the present invention is included to secure a flame retardant and non-flammable properties and may be a polyphenylene sulfide polymer having a melt index (ASTM D-1238, 235° C.) of 100 g/10 min to 150 g/10 min. When the melt index is less than 100 g/10 min, the resin has high friction with the carbon fiber during the impregnation process with the carbon fiber and causes cutting (trimming) of the carbon fiber, deteriorating the impregnation with the fiber. In addition, when the melt index is greater than 150 g/10 min, the impregnation of the resin with the fiber is increased, but the resin has so high flowability in the molding process of a finished product as to generate pores and the like inside the material and thus cause a difference between theoretical density and actual density, and in the high-pressure process of the finished product, the resin alone may exhibit a different distribution in each section due to the high flowability, or a thickness deviation and a difference in physical properties in the product may occur.

The first polymer resin may be included in an amount of 10 wt % to 30 wt % based on the total weight of the thermoplastic composite composition. When the first polymer resin is included in an amount of less than 10 wt %, mechanical properties may be deteriorated due to a reduction of molecular weight, but when the first polymer resin is included in an amount of greater than 30 wt %, the resin flowability of the entire thermoplastic composite composition may be lowered, deteriorating impregnation performance.

In the present invention, the polyphenylene sulfide has no long molecular chain and thus exhibits no excellent mechanical strength or moldability but almost maintains rigidity at the room temperature even at a high temperature. The polyphenylene sulfide has characteristics of withstanding most of solvents excluding oxidizing agents, alkalis, and inorganic salts.

Accordingly, since the polyphenylene sulfide has excellent non-combustible properties, the polyphenylene sulfide, of which the mechanical strength is increased, may be suitably used as a material for aviation and is desirably used as an alloy with the carbon fiber.

However, the polyphenylene sulfide has no high interface adherence and compatibility with the carbon fiber and thus has a problem of deteriorating binding strength between the fiber and resin.

Therefore, in the present invention, the second polymer resin including the polyphenylene sulfide polymer having the melt index (ASTM D-1238, 235° C.) of 250 to 850 g/10 min and the amorphous monomer having the aliphatic cyclobutanediol is used.

The polyphenylene sulfide polymer included in the second polymer resin may preferable have a melt index (ASTM D-1238, 235° C.) of 250 to 850 g/10 min in consideration of final processing conditions of the composite.

The amorphous monomer having the aliphatic cyclobutanediol is to induce affinity between the polyphenylene sulfide, which is a thermoplastic resin, and the carbon fiber, and thus maximizes the impregnation, and as far as a specific gravity thereof is 1.14 to 1.18, and inherent viscosity is 0.6 to 1 dL/g, it may be used without any special restrictions.

For reference, the inherent viscosity ($\eta_{inh}$) may be measured, as is commonly known, in the following method.

$$\eta_{inh} = \frac{\ln \eta_{rel}}{c}$$

Herein, in the above formula, c is a mass concentration of a polymer (g/dL), and $\eta_{rel}$ is relative viscosity, wherein the relative viscosity indicates viscosity of a solution/viscosity of a solvent.

When the inherent viscosity of the amorphous monomer having an aromatic cyclobutanediol is less than 0.6 dL/g, the amorphous monomer may have excellent dispersibility but does not satisfy the required physical properties, but when the inherent viscosity is greater than 1 dL/g, there is a problem of deteriorating dispersibility when combined with the polyphenylene sulfide.

In the present invention, the second polymer resin may be prepared to include 70 wt % to 80 wt % of the polyphenylene sulfide polymer and 20 wt % to 30 wt % of the amorphous monomer having the aliphatic cyclobutanediol.

In the present invention, after mixing the first polymer resin with the second polymer resin, a final melt index (ASTM D-1238, 235° C.) may be 100 g/10 min to 200 g/10 min in consideration of the final processing conditions of the composite.

In the present invention, the carbon fiber is used to improve strength and elasticity of the resin and may desirably have 800 tex (g/km) to 1100 tex (g/km) on average. When the carbon fiber has less than 800 tex (g/km), the impregnation may be increased, but the cutting (trimming) phenomenon may excessively occur during the impregnation processing of the carbon fiber with the polymer resin, and when the carbon fiber has greater than 1100 tex (g/km), the cutting of the carbon fiber may be reduced, but the impregnation with the polymer resin may deteriorated, resultantly deteriorating mechanical properties of the composite.

The carbon fiber is configured in the form of a continuous fiber to meet the required properties of the composite and surface-treated by using a high heat-resistant water-soluble polyimide instead of general silane-based, epoxy-based, polyamide-based, and polyurethane-based sizing agents. When the carbon fiber surface-treated with the high heat-resistant water-soluble polyimide is not used, in the manufacturing process of a composite at a high temperature of 300° C. or higher, internal pores may be largely generated due to thermal decomposition, or the cutting (trimming) phenomenon may frequently occur.

The carbon fiber surface-treated with a polyimide may be included in an amount of 50 wt % to 80 wt % based on the total weight of the thermoplastic composite composition. When the carbon fiber surface-treated with polyimide is included in an amount of less than 50 wt %, properties required by a high heat resistance and high rigidity thermoplastic composite are not satisfied and thus may not be used for aviation parts, but when included in an amount of greater than 80 wt %, there is a problem of hardly securing as uniform impregnation with the resin as processible in consideration of specific gravity and volume of the first polymer resin.

In the present invention, the fatty acid compound may be used in a form including acrylic acid, pentatrierythritol, nigrosine, etc. for the decomposition and processability improvement of the polymer resin, but is not limited thereto. The fatty acid compound may be included in an amount of 0.5 wt % to 2 wt % based on the total weight of the thermoplastic composite composition. When the fatty acid compound is included in an amount of less than 0.5 wt %, friction of the carbon fiber with the polymer resin may be increased during the preparation of the thermoplastic composite, and thus, may generate the cutting of the carbon fiber, and when included in an amount of greater than 2 wt %, there are problems of increasing volatilized gas and whitening on the appearance of a product after the molding.

In the present invention, the heat-resistant additive is used to improve decomposition and processability of the polymer resin, and for example, includes phosphorus-based, sulfur-based, phenol-based, an ultraviolet (UV) stabilizer, and the like, but is not limited thereto. The heat-resistant additive may be included in an amount of 0.001 wt % to 3 wt % based on the total weight of the thermoplastic composite composition, which may be adjusted in consideration of molding conditions, long-term heat resistance performance, and the like according to a developed product.

When the heat-resistant additive is included in an amount of greater than 3 wt %, since properties and moldability of the product are deteriorated, the amount thereof is desirable to be minimized.

The thermoplastic composite composition of the present invention may be used as a woven sheet-type composite using UD (Unidirectional) Tape and continuously impregnated tape.

In addition, the present invention uses a high-rigidity and high-heat resistance composite made of the thermoplastic composite composition and thus may provide aeronautical interior parts or structural materials and molded products for structural brackets. The aeronautical interior parts may be exemplified as "C" type and "Z" type reinforcing structural materials and the like, which are mainly used for stringers included inside the interior parts, but the present invention is not limited thereto.

DETAILED DESCRIPTION OF THE EMBODIMENTS

Hereinafter, the present invention will be described in more detail through examples. These examples are only for illustrating the present invention, and it will be apparent to those of ordinary skill in the art that the scope of the present invention is not to be construed as being limited by these examples.

Examples 1 to 3 and Comparative Examples 1 to 4: Preparation of Specimens Using a Thermoplastic Composite Composition 1-1: Preparation of First Polymer Resin A polyphenylene sulfide polymer was put in a twin-screw extruder having a screw diameter of 30 mm at 300° C., and each first polymer resin having a melt index (ASTM D-1238, 235° C.) of 150 g/10 min and 250 g/10 min was prepared.

1-2: Preparation of Second Polymer Resin

A second polymer resin was prepared by putting a polyphenylene sulfide polymer having a melt index (ASTM D-1238, 235° C.) of 800 g/10 min and an amorphous monomer having an aliphatic cyclobutanediol having specific gravity of 1.16 and inherent viscosity of 0.6 dL/g according to a composition shown in Table 1 in a twin-screw extruder having a screw diameter of 30 mm at about 300° C.

1-3: Preparation of UD Tape of Composite

The first polymer resin prepared in 1-1, the second polymer resin prepared in 1-2, a carbon fiber, a fatty acid compound, and a heat-resistant additive were mixed according to compositions shown in Table 1 through a screw and a barrel at 300° C. to 320° C., and then passed through a die section for impregnation, which was set at 290° C. to 350° C., preparing a UD (Unidirectional) Tape. Herein, the UD (Unidirectional) Tape was produced by setting a friction section of the carbon fiber with the polymer resins at a point 4 in order to facilitate compatibility and impregnation but a production speed at 3 to 5 m/min in order to not apply an excessive tensile force to the carbon fiber.

TABLE 1

|  | Carbon fiber | | First polymer resin | | Second polymer resin | | Others | | Total resin flow index |
| --- | --- | --- | --- | --- | --- | --- | --- | --- | --- |
|  | A | A' | B | B' | C | D | E | F | (g/10 min) |
| Example 1 | 60 | — | 19 | — | 15 | 5 | 0.5 | 0.5 | 180 |
| Example 2 | 60 | — | 19 | — | 13 | 7 | 0.5 | 0.5 | 175 |
| Example 3 | 60 | — | 19 | — | 10 | 10 | 0.5 | 0.5 | 170 |
| Comparative Example 1 | 60 | — | 39 | — | — | — | 0.5 | 0.5 | 150 |
| Comparative Example 2 | 60 | — | 19 | — | — | 20 | 0.5 | 0.5 | 78 |
| Comparative Example 3 | 60 | — | — | 19 | 15 | 5 | 0.5 | 0.5 | 300 |
| Comparative Example 4 | — | 60 | 19 | — | 15 | 5 | 0.5 | 0.5 | 180 |

A: Carbon fiber surface-treated with polyimide
A': Carbon fiber surface-treated with epoxy
B: Polyphenylene sulfide polymer (melt index: 150 g/10 min)
B': Polyphenylene sulfide polymer (melt index: 250 g/10 min)
C: Polyphenylene sulfide polymer (melt index: 800 g/10 min)
D: Cyclobutanediol monomer
E: Fatty acid compound
F: Heat-resistant additive Experimental Example 1

UD Tape (specimens) according to Examples 1 to 3 and Comparative Examples 1 to 4 were measured with respect to specific gravity, tensile strength, tensile modulus, and compressive strength, and the results are shown in Table 2.

The properties were measured in the following method.

1-1: Measurement of Specific Gravity

Based on the standards of ASTM D 792, the specific gravity of the specimens was measured using a D-S (TOYO-SEIKI, Japan) apparatus.

1-2: Measurement of Tensile Strength

The tensile strength of the specimens was measured according to ASTM D638 by using a Model 45 (MTS, USA) device.

1-3: Measurement of Tensile Modulus

The tensile modulus of the specimens was measured according to ASTM D638 by using a Model 45 (MTS, USA).

1-4: Measurement of Compressive Strength

Based on the standards of ASTM D638 and using a Model 45 (MTS, USA) device, the compressive strength of the specimen was measured.

TABLE 2

|  | Specific gravity (g/cm$^3$) | Tensile strength (MPa) | Tensile modulus (GPa) | Compressive strength (MPa) |
| --- | --- | --- | --- | --- |
| Example 1 | 1.57 | 2,150 | 130 | 1,220 |
| Example 2 | 1.57 | 2,220 | 133 | 1,250 |
| Example 3 | 1.57 | 2,100 | 131 | 1,198 |
| Comparative Example 1 | 1.59 | 1,660 | 122 | 920 |
| Comparative Example 2 | 1.53 | 850 | 65 | 220 |
| Comparative Example 3 | 1.57 | 1,825 | 129 | 1,112 |
| Comparative Example 4 | 1.57 | 1,350 | 105 | 912 |

Referring to Table 2, Examples 1 to 3 exhibited excellent tensile strength, tensile modulus, and compressive strength, but Comparative Example 1 using no second polymer exhibited significantly deteriorated tensile strength and compressive strength, compared with Example 1.

In addition, as in Comparative Example 2, when a content of the cyclobutanediol monomer was excessively high, the cyclobutanediol monomer had an excessive influence on physical properties, and also deteriorated impregnation during the manufacturing process.

In addition, as in Comparative Example 3, as a flow index of the processed resin increased, the resin with a high flow index had an advantageous aspect in the manufacturing process but deteriorated the properties.

In addition, as shown in Comparative Example 4, when carbon fiber surface-treated not with polyimide but with epoxy was used, compatibility of the carbon fiber with a resin was deteriorated, deteriorating properties.

Referring to the aforementioned results, when a first polymer resin of a polyphenylene sulfide polymer; a second polymer resin including polyphenylene sulfide and alloyed with an aliphatic cyclobutanediol monomer to improve compatibility and impregnation; a fatty acid compound; a heat-resistant additive; and a carbon fiber surface-treated (sized) with polyimide were impregnation-processed, a composite with excellent tensile strength, tensile modulus, and compressive strength was obtained and thus may be used to manufacture an aeronautical interior and a structural molded product.

As the specific parts of the present invention have been described in detail above, for those of ordinary skill in the art, it is clear that these specific descriptions are only preferred embodiments, and the scope of the present invention is not limited thereby. Accordingly, the actual scope of the present invention will be defined by the appended claims and their equivalents.

INDUSTRIAL APPLICABILITY

Since the thermoplastic composite composition according to the present invention uses the polymer resin including the amorphous monomer having aliphatic cyclobutanediol, compatibility of the carbon fiber and the thermoplastic resin may increase, leading to an improvement in impregnation properties, so that the thermoplastic composite composition may be used to manufacture a high-rigidity and high-heat resistance aeronautical interior and structural molded product.

The invention claimed is:

1. A thermoplastic composite composition, comprising:
   (a) a first polymer resin including a polyphenylene sulfide polymer having a melt index (ASTM D-1238, 235° C.) of 100 to 150 g/10 min;
   (b) a second polymer resin including a polyphenylene sulfide polymer having a melt index (ASTM D-1238, 235° C.) of 250 to 850 g/10 min and an amorphous monomer having an aliphatic cyclobutanediol;
   (c) a carbon fiber surface-treated with a polyimide;
   (d) a fatty acid compound; and
   (e) a heat-resistant additive.

2. The thermoplastic composite composition of claim 1, wherein the second polymer resin comprises 70 to 80 wt % of the polyphenylene sulfide polymer and 20 to 30 wt % of the amorphous monomer having the aliphatic cyclobutanediol.

3. The thermoplastic composite composition of claim 1, wherein the amorphous monomer having the aliphatic cyclobutanediol has a specific gravity of 1.14 to 1.18 and inherent viscosity of 0.6 to 1 dL/g.

4. The thermoplastic composite composition of claim 1, wherein the carbon fiber is 800 to 1100 tex (g/km) on average.

5. The thermoplastic composite composition of claim 1, wherein 10 to 30 wt % of the first polymer resin, 10 to 25 wt % of the second polymer resin, and 50 to 79 wt % of the carbon fiber surface-treated with a polyimide, 0.5 to 2 wt % of the fatty acid compound, and 0.001 to 3 wt % of the heat-resistant additive are included based on the total amount of the thermoplastic composite composition.

6. An aeronautical interior part manufactured by the thermoplastic composite composition of claim 1.

7. A molded product for an aeronautical bracket made of the thermoplastic composite composition of claim 1.

\* \* \* \* \*